Feb. 6, 1923.
C. Z. COLEMAN.
ELECTRIC MOTOR.
FILED OCT. 28, 1921.
1,444,495.
2 SHEETS—SHEET 1.
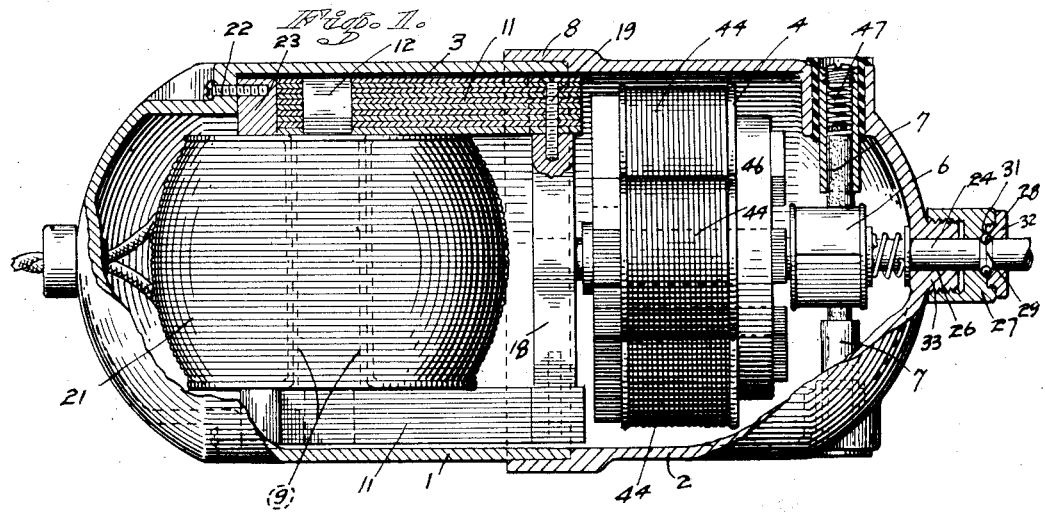
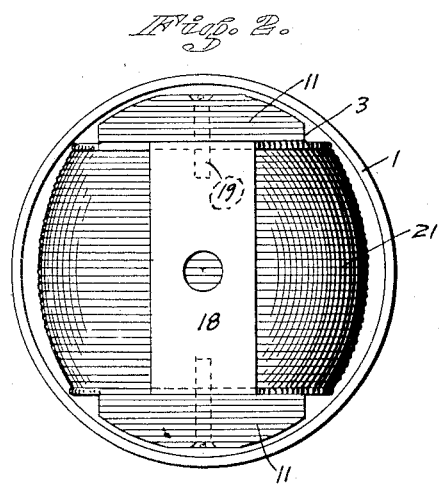
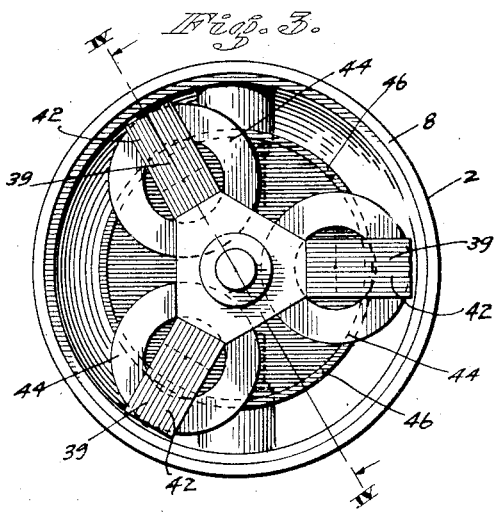
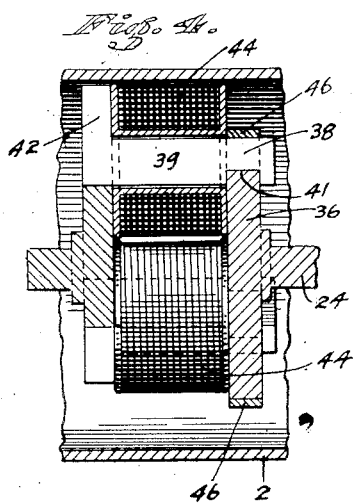
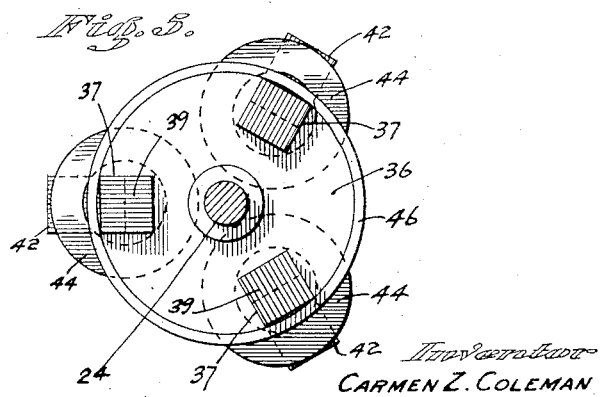
Inventor
CARMEN Z. COLEMAN Feb. 6, 1923.                                                          1,444,495.
                          C. Z. COLEMAN.
                          ELECTRIC MOTOR.
                        FILED OCT. 28, 1921.                    2 SHEETS—SHEET 2.
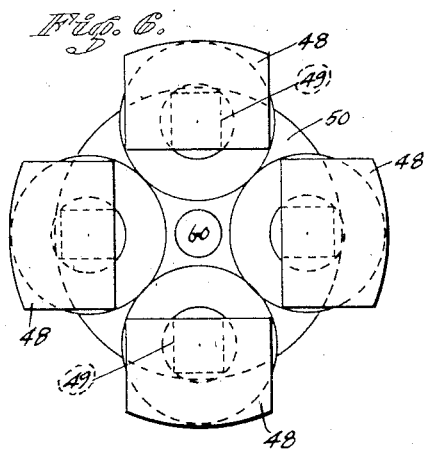
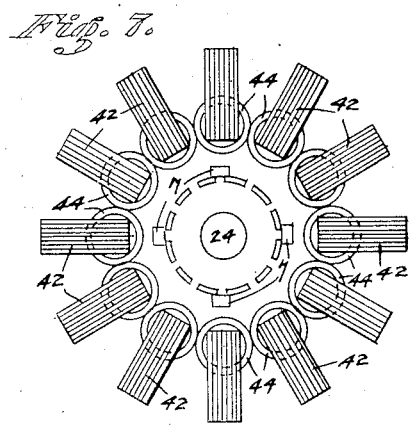
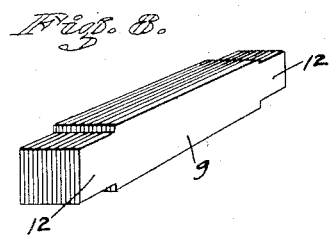
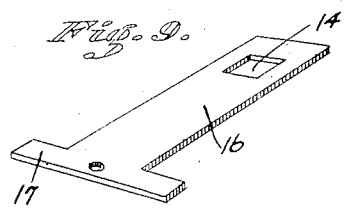
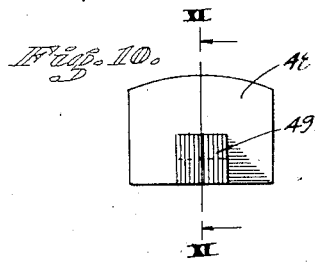
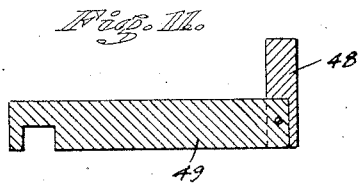
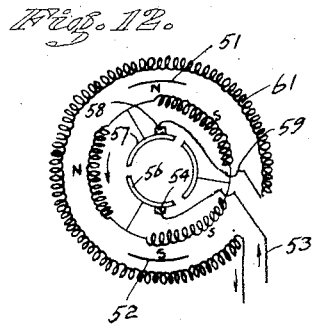
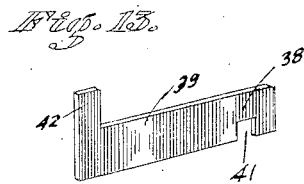
Inventor
CARMEN Z. COLEMAN
By Munn & Co
Attorneys.

Patented Feb. 6, 1923.

1,444,495

UNITED STATES PATENT OFFICE.

CARMEN Z. COLEMAN, OF SAN FRANCISCO, CALIFORNIA.

ELECTRIC MOTOR.

Application filed October 28, 1921. Serial No. 511,185.

*To all whom it may concern:*

Be it known that I, CARMEN Z. COLEMAN, a citizen of the United States, and a resident of San Francisco, county of San Francisco, and State of California, have invented a new and useful Electric Motor, of which the following is a specification.

The present invention relates to improvements in electric motors and the like and its principal object is to provide an electric motor that will develop a maximum of power although confined in a comparatively small space. While it is customary in a motor to arrange the armature coils so that they rotate between the respective north and south pole pieces of the field, I arrange my armature coils in front of the magnet or magnets constituting the field. In this manner a longer lever arm is provided for the armature and since the power developed in a motor is the product of the force exercised and the length of the arm, a greater power will be obtained by the introduction of a longer lever arm, or, to express it in another way, an equal power can be obtained from a motor presenting smaller field dimensions. A further object of my invention is to construct a motor which is exceedingly simple and economic to make, which is easily taken apart and can, therefore, be readily repaired and at the same time insures a perfect insulation of the conductors.

With these objects in view I have illustrated the preferred form of my invention in the accompanying drawing, it being understood that a number of changes or modifications as to the details of the device might be made without affecting the spirit of the invention and without leaving the scope of the claims hereto attached.

Figure 1 represents a longitudinal cross section through my motor; Figure 2 an end elevation of the field portion of the motor looking at it from the right side as viewed in Figure 1; Figure 3 an end elevation of the armature portion of the motor looking at it from the left hand side as viewed in Figure 1; Figure 4 a cross section through the armature along lines 4—4 of Figure 3, a portion being broken away; Figure 5 an end elevation of the armature looking at it from the right side as viewed in Figure 1; Figure 6 a diagrammatic end view of a field presenting four pole pieces; Figure 7 a diagrammatic end view of an armature representing a plurality of pole pieces; Figure 8 a perspective detail view of a cross member connecting the two legs of the U-shaped field magnet; Figure 9 a perspective detail view showing one of the laminations constituting the legs of the field magnet; Figure 10 an end view of one of the pole pieces of the field illustrated in Figure 6; Figure 11 a cross section through the pole pieces of Figure 10 along line 11—11 of said figure; Figure 12 a wiring diagram, and Figure 13 a perspective detail view of one of the laminations forming the core for the armature coils.

The housing on my motor consists of two sections (1) and (2), the former providing a support for the field magnet (3) while the latter contains the armature (4), the commutator (6) and the brushes (7). The housing sections are preferably cylindrical in form, one of them being provided with a flange (8) adapted to fit around the other section so as to constitute a firm connection with the same.

The field is presented as a U-shaped electromagnet formed of the base (9) and the two legs (11). The base (9) is shown in detail in Figure 8 and comprises a plurality of substantially rectangular laminations having reduced end portions (12) adapted to fit into corresponding perforations (14) of the laminations (16) constituting the legs of the magnet. The latter laminations are T-shaped, the T beams (17) presenting the face of the pole. The two pole pieces are held in spaced relation to each other by means of a bracing member (18) which is made of non-magnetic material and secured between the pole pieces by means of screws (19). A coil (21) is wound on the base member (9) of the magnet and the whole magnet is secured in the housing by means of small screws (22) engaging brass caps (23) sweated to the field magnet as shown in Figure 1.

The bracing member (18) serves as one of the supports for the armature shaft (24), the other end of which is rotatably supported in the section (2) of the housing as shown at (26). For proper adjustment of the armature relative to the field magnet I provide adjusting means for the shaft in the sleeve (27) rotatably mounted on the shaft and prevented from moving longitudinally by the balls (28) traveling in registering grooves (29) and (31) of the shaft and the sleeve respectively, a cap (32) forming a part of this arrangement. One end of the sleeve is threaded internally and adapted to be screwed on an externally threaded boss (33) extending from the housing. By means of this arrangement the shaft can be adjusted longitudinally by turning the sleeve (27) on the boss (33). On this shaft is rigidly supported the disc (36) having a plurality of circumferential recesses (37) distributed over the same in symmetrical arrangement. These recesses are adapted to receive the necks (38) of laminations (39) formed by corresponding recesses (41) in said laminations. One of these laminations is shown in detail in Figure 13. It is substantially L-shaped, the base (42) of the L forming the pole face. A plurality of these laminations form a core for the coils (44) and the cores are firmly held against the disc (36) by means of a ring (46) adapted to be slipped on the disc after the cores are in place. The commutator (6) as well as the brushes (7) actuated by the springs (47) do not offer any new features.

It will be readily understood that my motor is not confined to any number of pole pieces in the field, or armature coils, and a motor presenting four field pole pieces and a larger plurality of armature coils is illustrated in Figures 6 and 7. The field pole pieces selected for the device illustrated in Figure 6 differ somewhat from those shown in Figure 1 in this respect; that the legs (49) of the different pole pieces are grouped around a disc (50) in a similar manner as previously described with reference to the armature mounting, and that the pole face (48) is made of a single piece of metal, as illustrated in Figures 10 and 11, while the legs themselves are made of laminations. The disc (50) is provided with a central hole (60) adapted to support one end of the armature shaft. In other respects the motor shown in Figures 6 and 7 does not present any essential differences over that shown in Figure 1.

In Figure 12 is shown a wiring diagram for my motor, the armature and the field being wound in series. The north and south poles (51) and (52) of the field are indicated by the letters "N" and "S", and the current is caused to flow through the wire (53) and the brush (54) into the commutator segment (56) from where it flows through the coils in opposite direction to return to the commutator segment (57) and to be led through the brush (58) and the wire (59) into the field winding (61). In this manner the armature cores are magnetized so as to be successively attracted and repelled by the north and south poles of the field whereby rotary motion is imparted to the shaft of the armature.

I claim:

1. In a device of the character described, an electro-magnet comprising a disc having a plurality of symmetrically arranged circumferential recesses, a core for each recess having a registering recess engaging the former, a ring surrounding the disc for securing the cores to the same, and a coil around each core.

2. In a device of the character described, an armature comprising a shaft, a disc rigidly secured thereon having a plurality of symmetrically arranged circumferential recesses, an armature core for each recess having a registering recess for engaging the former and a ring surrounding the disc for securing the cores to the same.

3. In a device of the character described, an armature comprising a shaft, a disc rigidly secured thereon having a plurality of symmetrically arranged circumferential recesses, an armature core for each recess comprising a plurality of laminations having registering recesses therein engaging the former, and a ring surrounding the disc for securing the cores to the same.

4. An electric motor of the character described comprising a housing consisting of two sections, a field magnet supported in one of the sections having a bracing member between the pole pieces and an armature rotatably supported in the other section and said bracing member.

5. An electric motor of the character described comprising a housing consisting of two sections, a field magnet supported in one of the sections having a bracing member between the pole pieces and an armature rotatably supported in the other section and said bracing member, and means for axially adjusting the armature.

6. An electric motor of the character described comprising a housing consisting of two sections, a plurality of field pole pieces mounted in circumferential relation in one of said sections, a bracing member between said field pole pieces, and a plurality of armature pole pieces rotatably mounted in the other section and said bracing member in similar circumferential arrangement so as to pass in front of the field pole pieces.

7. An electric motor of the character described comprising a housing consisting of two sections, a plurality of field pole pieces mounted in circumferential relation in one of said sections, a bracing member between said field pole pieces, and a plurality of armature pole pieces rotatably mounted in the other section and said bracing member in similar circumferential arrangement so as to pass in front of the field pole pieces, and means for adjusting the distance between the field and armature pole pieces.

8. An electric motor of the character described comprising a housing consisting of two sections, a plurality of field pole pieces mounted in circumferential relation in one of said sections, a bracing member between said field pole pieces, and a plurality of armature pole pieces rotatably mounted in the other section and said bracing member in similar circumferential arrangement so as to pass in front of the field pole pieces, and means for adjusting the distance between the field and armature pole pieces, including an armature shaft, a sleeve rotatably mounted on the shaft held against longitudinal motion and adjustable means for securing the sleeve to the housing.

9. In a device of the character described, an electro-magnet comprising a disc having a plurality of circumferential recesses, a core for each recess having a registering recess engaging the former, means for securing the cores to the disc, and a coil around each core.

CARMEN Z. COLEMAN.